United States Patent
Saito et al.

(10) Patent No.: US 7,420,765 B2
(45) Date of Patent: Sep. 2, 2008

(54) SEEK CONTROL APPARATUS, SEEK CONTROL METHOD AND STORAGE APPARATUS

(75) Inventors: Tomoaki Saito, Kawasaki (JP); Isamu Tomita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/650,275

(22) Filed: Jan. 4, 2007

(65) Prior Publication Data

US 2008/0013204 A1    Jan. 17, 2008

(30) Foreign Application Priority Data

Jul. 14, 2006    (JP) .............................. 2006-193654

(51) Int. Cl.
*G11B 5/596* (2006.01)
(52) U.S. Cl. ................................. 360/78.06; 360/78.04
(58) Field of Classification Search .................... None
See application file for complete search history.

(56) References Cited

U.S. PATENT DOCUMENTS

| 5,708,632 | A | 1/1998 | Totsuka et al. |
| 5,914,916 | A | 6/1999 | Totsuka et al. |
| 6,801,711 | B1 | 10/2004 | Kim et al. |
| 2003/0039154 | A1* | 2/2003 | Suzuki ...................... 365/200 |
| 2003/0194208 | A1* | 10/2003 | Inoue et al. ................... 386/52 |

FOREIGN PATENT DOCUMENTS

| JP | 09-185864 | 7/1997 |
| JP | 2000-195168 | 7/2000 |

* cited by examiner

*Primary Examiner*—Jason C Olson
(74) *Attorney, Agent, or Firm*—Greer, Burns & Crain, Ltd

(57) ABSTRACT

A seek control apparatus for performing a seek control of a head comprises an MCU that acquires control information corresponding to the externally indicated data length out of the control information stored in a storage section storing the control information for seek control for each of a plurality of data length ranges and performs a seek control according to the acquired control information.

17 Claims, 8 Drawing Sheets

SEEK CONTROL APPARATUS, SEEK CONTROL METHOD AND STORAGE APPARATUS

BACKGROUND OF THE INVENTION

1. Field of the Invention

This invention relates to a seek control apparatus, a seek control method and a storage apparatus for performing a seek control of a head.

2. Description of the Related Art

Heads are required to be positioned more rigorously accurately than ever in response to the increase in recent years of the number of TPI (tracks per inch) in HDDs (hard disk drives). On the other hand, such heads are required to be accelerated more sharply than ever for seek control from the viewpoint of realizing high speed seek operations.

Note that, the conventional art that relates to the present invention includes methods and apparatus for controlling accesses to recording disks for the purpose of realizing high speed random accesses to recording disk (see, inter alia, Pat. Document 1: Jpn. Pat. Appln. Laid-Open Publication No. 9-185864).

However, as a head is accelerated sharply, a problem of residual oscillations and a consequent problem of write off track can arise. Residual oscillations are oscillations of the position of a head immediately after the end of a seek control process. Such oscillations adversely affect the accuracy of head positioning control. FIG. 10 of the accompanying drawings is a graph showing residual oscillations as an example. In FIG. 10, the horizontal axis indicates time and the vertical axis indicates the head position. A track center and two write off track slices (+ side and − side) are also shown in FIG. 10. The track center refers to a target position and the two write off track slices refer to the + side positional limit and the − side positional limit of the head.

As long as the head position oscillates within the write off track slices, there does not arise any problem of degradation of performance of the head. However, once the head position goes beyond either of the write off track slices, the head faces write prohibition and is subjected to a retry process (of trying to write once again after a full turn of the corresponding disk) to degrade the performance thereof.

Now, the relationship between the block length and performance degradation will be discussed below. FIG. 11 of the accompanying drawings is a timing chart illustrating an example of relationship between a servo gate and a write gate in a 1-block write operation. Similarly, FIG. 12 of the accompanying drawings is a timing chart illustrating an example of relationship between a servo gate and a write gate in a 35-block write operation. In FIGS. 11 and 12, the upper row indicates the waveform of the servo gate and the lower row indicates the waveform of the write gate. The servo gate is a window that is opened in synchronism with the timing of demodulation of the servo pattern arranged on a medium, whereas the write gate is a window that is opened at the time of a write operation conducted on the medium. The servo gate and the write gate are never opened at the same time and the write gate is opened for a plurality of times between two consecutive open periods of the servo gate. The first through seventh servo frames are shown in FIGS. 11 and 12. In the instance of FIG. 12, data of 35 blocks are written over seven servo frames on the medium.

In the instance of the 1-block write operation illustrated in FIG. 11, it is possible to end the write operation without requiring any retry process when the position obtained as a result of servo demodulation of the first servo frame is found within the write off track slices. However, in the instance of the 35-block write operation illustrated in FIG. 12, all the frames including the first through seventh servo frames are required to be found within the write off track slices and a retry process is required if either of the slices is overrun. In other words, the probability of the necessity of executing a retry process rises as the block length to be written increases for the same waveform of residual oscillations.

SUMMARY OF THE INVENTION

In view of the above-identified problem, it is therefore an object of the present invention to provide a seek control apparatus, a seek control method and a storage apparatus for performing a seek control of a head that can prevent degradation of performance of the head due to residual oscillations in a seek operation.

In an aspect of the present invention, the above object is achieved by providing a seek control apparatus for performing a seek control of a head, comprising:

a control section that acquires control information corresponding to an externally indicated data length out of the control information stored in a control information storage section storing the control information for seek control for each of a plurality of data length ranges and performs a seek control according to the acquired control information.

Preferably, in a seek control apparatus according to the present invention, the control information includes information on a seek profile for each of the data length ranges.

Preferably, in a seek control apparatus according to the present invention, the control information includes information on the relationship between a seek distance and a seek time corresponding to each of the seek profiles.

Preferably, in a seek control apparatus according to the present invention, the control information includes information on the relationship between the seek distance and the seek time and a predetermined offset to be added to the seek time for each of the data length ranges and the control section performs a reordering operation according to the control information.

Preferably, in a seek control apparatus according to the present invention, the offset is determined according to a retry probability in each of the data length ranges.

Preferably, in a seek control apparatus according to the present invention, the data length is an externally indicated data length of a write operation or a read operation.

Preferably, in a seek control apparatus according to the present invention, the data length is a block length.

In another aspect of the present invention, there is provided a seek control method for performing a seek control of a head, comprising:

a control information acquisition step that acquires control information corresponding to an externally indicated data length out of the control information stored in advance for seek control for each of a plurality of data length ranges; and a control step that performs a seek control according to the control information acquired in the control information acquisition step.

Preferably, in a seek control method according to the present invention, the control information includes information on a seek profile for each of the data length ranges.

Preferably, in a seek control method according to the present invention, the control information includes information on the relationship between a seek distance and a seek time corresponding to each of the seek profiles.

Preferably, in a seek control method according to the present invention, the control information includes information on the relationship between the seek distance and the seek time and a predetermined offset to be added to the seek time for each of the data length ranges and the control step performs a reordering operation according to the control information.

Preferably, in a seek control method according to the present invention, the offset is determined according to a retry probability in each of the data length ranges.

Preferably, in a seek control method according to the present invention, the data length is an externally indicated data length of a write operation or a read operation.

Preferably, in a seek control method according to the present invention, the data length is a block length.

In still another aspect of the present invention, there is provided a storage apparatus to be used for seek control of a head, the storage apparatus comprising:

a control information storage section that stores control information for seek control for each of a plurality of predetermined data length ranges; and a control section that acquires the control information corresponding to an externally indicated data length out of the control information stored in the control information storage section and performs a seek control according to the control information.

Preferably, in a storage apparatus according to the present invention, the control information includes information on s seek profile for each of the data length ranges.

Preferably, in a storage apparatus according to the present invention, the control information includes information on the relationship between a seek distance and a seek time corresponding to each of the seek profiles.

Preferably, in a storage apparatus according to the present invention, the control information includes information on the relationship between the seek distance and the seek time and a predetermined offset to be added to the seek time for each of the data length ranges and the control section performs a reordering operation according to the control information.

Preferably, in a storage apparatus according to the present invention, the offset is determined according to the retry probability in each of the data length ranges.

Preferably, in a storage apparatus according to the present invention, the data length is the externally indicated data length of a write operation or a read operation.

Thus, according to the present invention, it is possible to prevent degradation of performance of a head due to residual oscillations in a seek operation.

DETAILED DESCRIPTION OF THE PREFERRED EMBODIMENTS

Now, preferred embodiments of the present invention will be described in greater detail by referring to the accompanying drawings.

First Embodiment

A first embodiment of the present invention is a magnetic disk apparatus (storage apparatus) adapted to use any of a plurality of different seek profiles according to the block length.

Firstly, the configuration of the magnetic disk apparatus of this embodiment will be described below.

Figure 1:
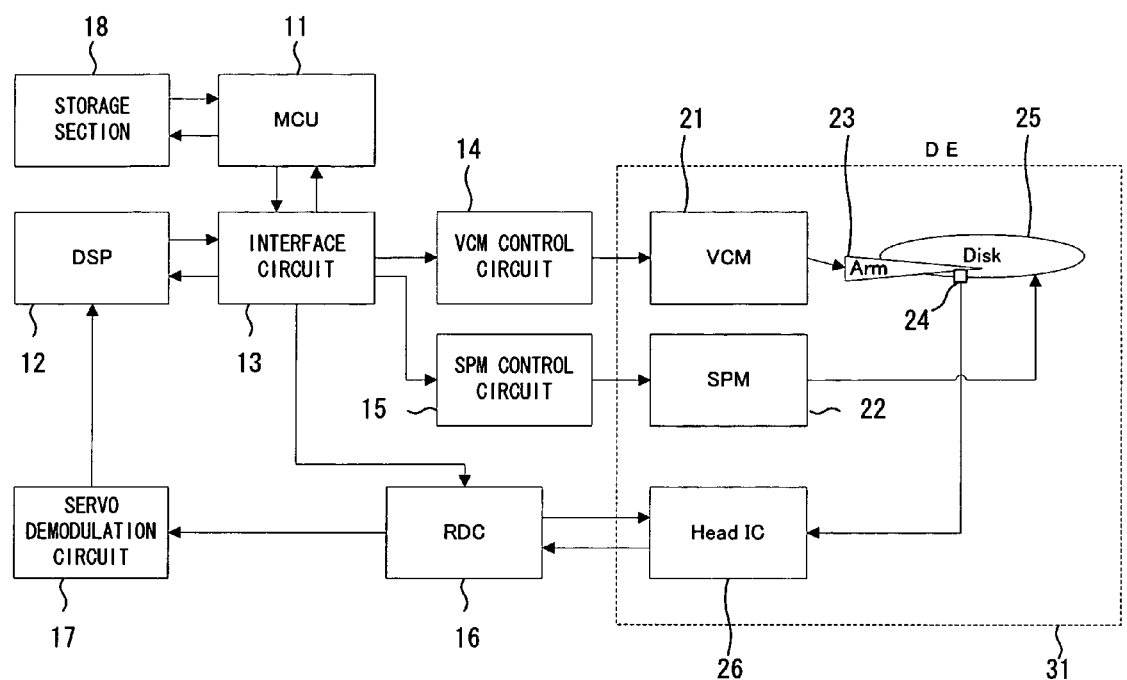
FIG. 1 is a schematic block diagram of a magnetic disk apparatus that is a storage apparatus of a first embodiment according to the present invention.

FIG. 1 is a schematic block diagram of the magnetic disk apparatus of this embodiment of storage apparatus according to the present invention. More specifically, FIG. 1 illustrates the components that relate to servo control. The apparatus comprises an MCU (micro controller unit) 11 (control section), a DSP (digital signal processor) 12, an interface circuit 13, a VCM (voice coil motor) control circuit 14, an SPM (spindle motor) control circuit 15, an RDC (read/write channel) 16, a servo demodulation circuit 17, a storage section 18 (control information storage section), a VCM 21, an SPM 22, an arm 23, a head 24, a disk 25 and a head IC 26. Of these, the VCM 21, the SPM 22, the arm 23, the head 24, the disk 25 and the head IC 26 are arranged in a DE (disk enclosure) 31. The head 24 is arranged at the front end of the arm 23.

Now, the operation of the servo control of the magnetic disk apparatus will be summarily described below. The MCU 11 controls each of the components of the magnetic disk apparatus. The storage section 18 typically stores the firmware that is necessary for the operation of the MCU 11. The interface circuit 13 operates to connect the MCU 11 and the DSP 12, the VCM control circuit 14, the SPM control circuit 15 and the RDC 16. The VCM control circuit 14 controls the VCM 21 according to the directives from the MCU 11. The VCM 21 drives the arm 23. The SPM control circuit 15 controls the SPM 22 according to the directives from the MCU 11. The SPM 22 drives the disk 25. The servo information read out by the head 24 is delivered to the MCU 11 by way of the head IC 26, the RDC 16, the servo demodulation circuit 17, the DSP 12 and the interface circuit 13.

Now, residual oscillations will be described in detail below.

Figure 2:
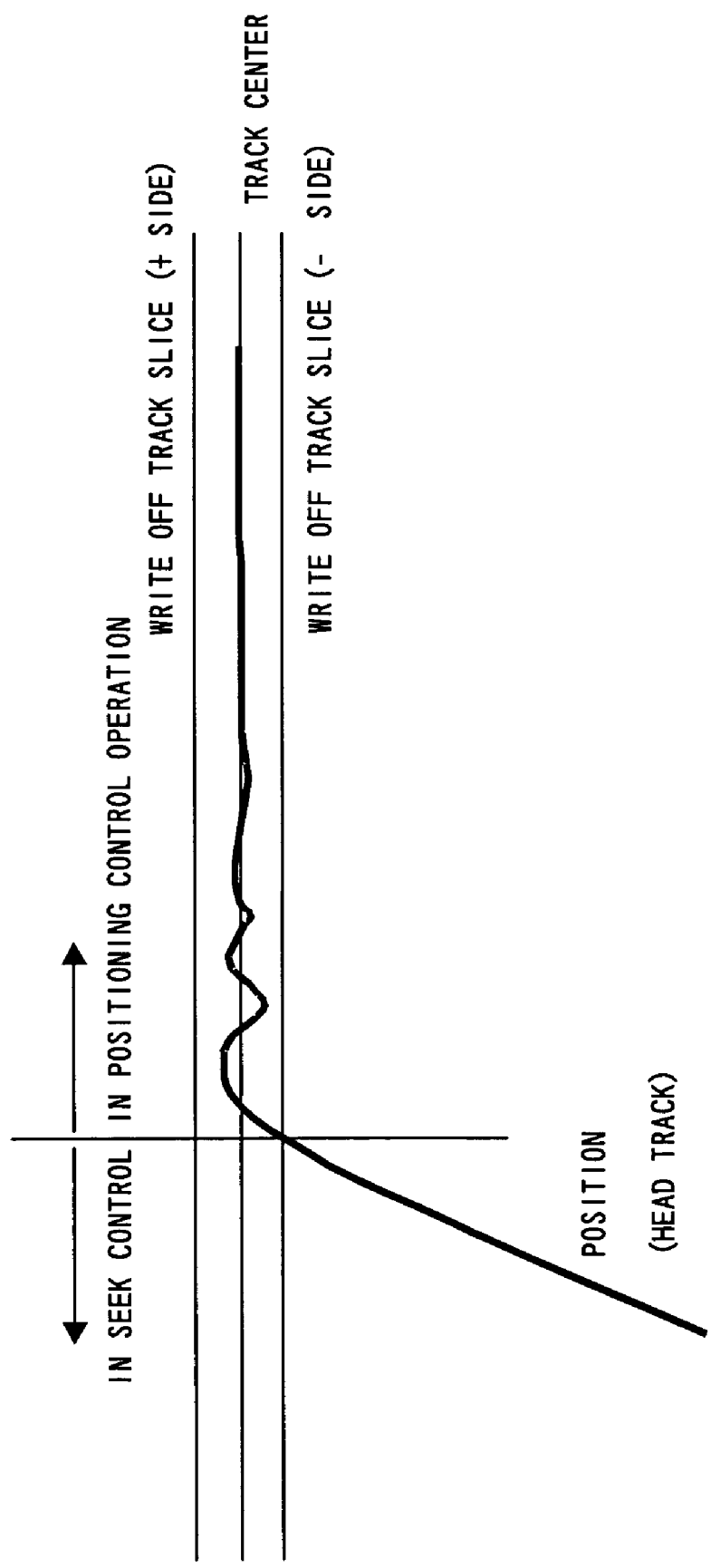
FIG. 2 is a graph illustrating an example of residual oscillations that can appear in the case of a long access time.
Figure 10:
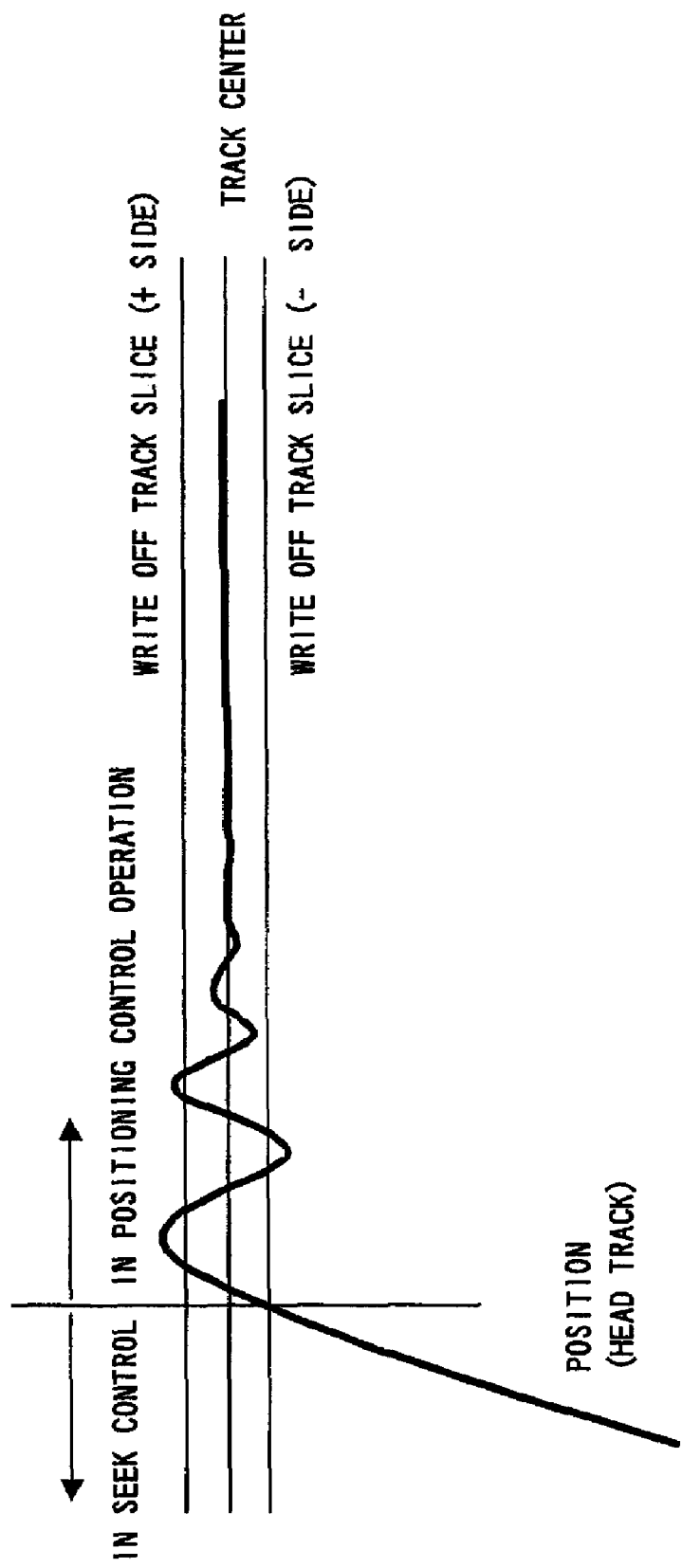
FIG. 10 is a graph illustrating an example of residual oscillations.

Residual oscillations attenuate as a certain time period passes. Additionally, residual oscillations are mostly reduced when a long seek time (access time) is spent (by reducing the seek speed) because the additional oscillations due to the adjustable electric current are reduced at the seek control time. FIG. 2 is a graph illustrating an example of residual oscillations that can appear in the case of a long seek time. More specifically, the seek time of FIG. 2 is longer than that of FIG. 10. If compared with FIG. 10, it will be seen that the residual oscillations are small and do not go beyond the write off track slices.

Figure 12:
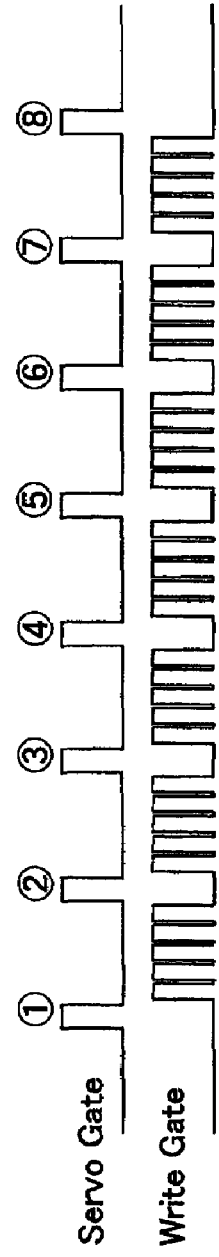
FIG. 12 is a timing chart illustrating an example of relationship between a servo gate and a write gate for 35-block write operation.
Figure 11:
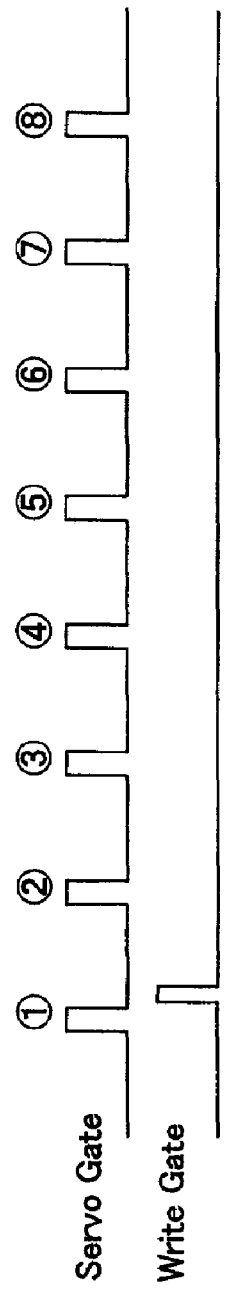
FIG. 11 is a timing chart illustrating an example of relationship between a servo gate and a write gate for a 1-block write operation.

Additionally, as pointed out above, residual oscillations attenuate with time, the probability of appearance of a write off track problem also falls with time. Assume here that the probability of appearance of a write off track problem is observed as shown below for the first through seventh servo frames in the instances of FIGS. 11 and 12.

1st Servo Frame
probability of appearance of write off track: 20% (probability of non-appearance: 80%)

2nd Servo Frame
probability of appearance of write off track: 18% (probability of non-appearance: 82%)

3rd Servo Frame
probability of appearance of write off track: 16% (probability of non-appearance: 84%)

4th Servo Frame
probability of appearance of write off track: 14% (probability of non-appearance: 86%)

5th Servo Frame
probability of appearance of write off track: 12% (probability of non-appearance: 88%)

6th Servo Frame
probability of appearance of write off track: 10% (probability of non-appearance: 90%)

7th Servo Frame
probability of appearance of write off track: 8% (probability of non-appearance: 92%)

As a result of observation, the probability of retry of the command for write 1 block remains to be 20%, while the probability of retry of the command for write 35 blocks rises to 65% (probability of retry=1−probability that all servo frames do not go off track=1−(0.8*0.82*0.84*0.86*0.88*0.9*0.92)=65%).

Thus, if the block length of the block to be written is long, the number of times of retry falls to improve the overall performance when residual oscillations are reduced by seek control, although the seek time may become long to a certain extent.

Now, the operation of the magnetic disk apparatus of this embodiment will be described below.

Figure 3:
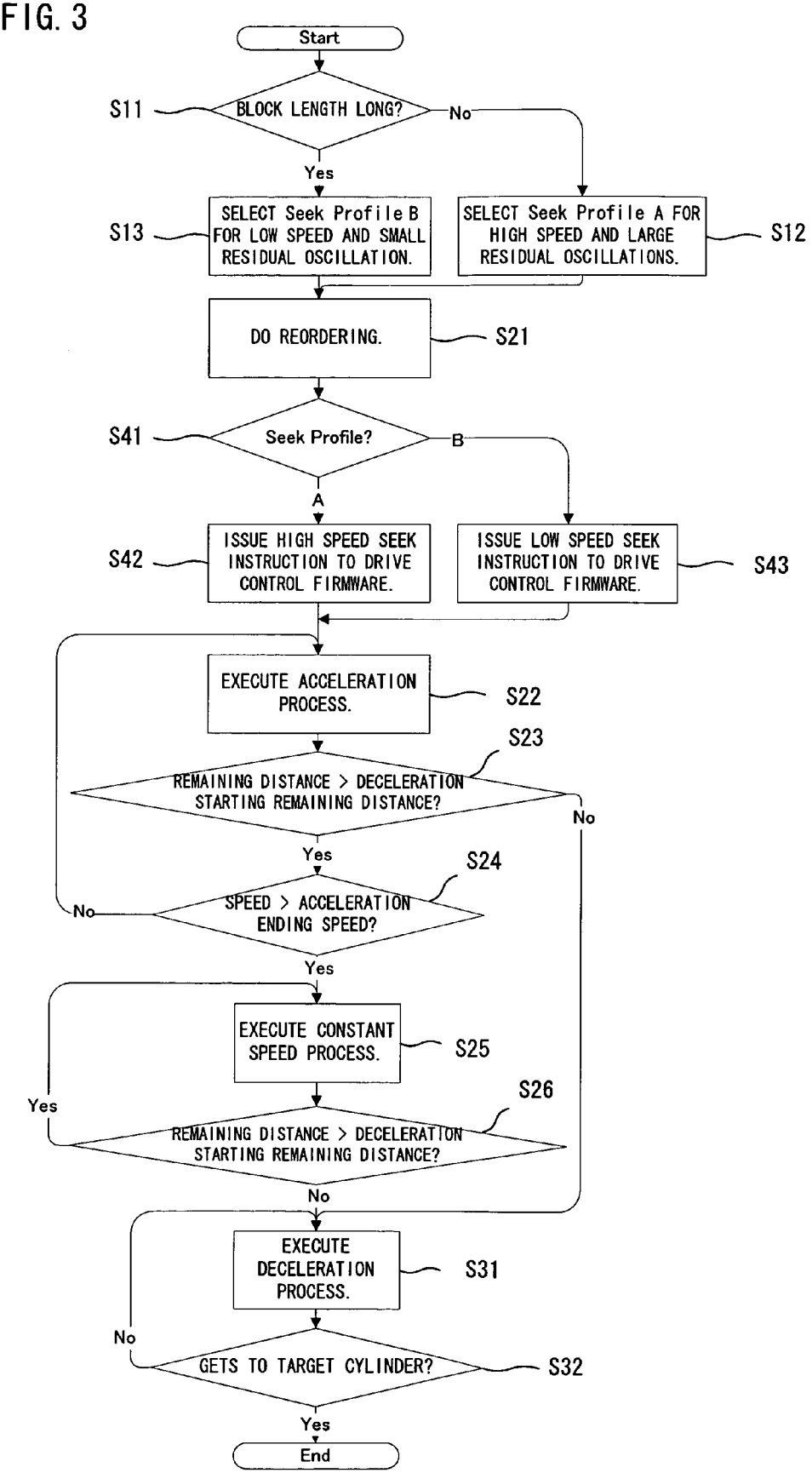
FIG. 3 is a flowchart of an example of operation of the magnetic disk apparatus of the first embodiment.

FIG. 3 is a flowchart of an example of operation of the magnetic disk apparatus of the first embodiment. Seek control based on speed control will be described for this embodiment. Firstly, the MCU 11 determines if the block length is not smaller than a predetermined threshold value or not (S11). If the block length is smaller than the predetermined threshold value (S11, No), the MCU 11 selects predefined seek profile A (S12). If, on the other hand, the block length is not smaller than the predetermined threshold value (S11, Yes), the MCU 11 selects predefined seek profile B (S13). The processing steps including S21 and the subsequent steps are the same as those of the conventional art. Then, the MCU 11 performs reordering (S21). Thereafter, the MCU 11 determines which of the seek profile A and the seek profile B is selected (S41). If the seek profile A is selected (S41, A), the MCU 11 issues a high speed seek instruction to the drive control firmware. If, on the other hand, the seek profile B is selected (S41, B), the MCU 11 issues a low speed seek instruction to the drive control firmware.

Then, the MCU executes an acceleration process (S22). Thereafter, the MCU 11 determines if the remaining distance is greater than a predetermined deceleration starting remaining distance or not (S23). If the remaining distance is smaller than the deceleration starting remaining distance (S23, No), the MCU 11 proceeds to the processing step S31. If, on the other hand, the remaining distance is greater than the deceleration starting remaining distance (S23, Yes), the MCU 11 determines if the speed is greater than a predetermined acceleration ending speed or not (S24). If the speed is smaller than the predetermined acceleration ending speed (S24, No), the MCU 11 returns to the processing step S22 and continues the acceleration process. If, on the other hand, the speed is greater than the predetermined acceleration ending speed (S24, Yes), the MCU 11 executes a constant speed process (S25). Then, the MCU 11 determines if the remaining distance is greater than the predetermined deceleration starting remaining distance or not (S26). If the remaining distance is greater than the deceleration starting remaining distance (S26, Yes), the MCU 11 returns to S25 and continues the constant speed process. If, on the other hand, the remaining distance is smaller than the deceleration starting remaining distance (S26, No), the MCU 11 executes a deceleration process (S31).

Subsequently, the MCU 11 determines if the head 24 gets to the target cylinder or not (S32). If the head 24 does not get to the target cylinder yet (S32, No), the MCU 11 returns to the processing step S31 and continues the deceleration process. If, on the other hand, the head 24 gets to the target cylinder (S32, Yes), the MCU 11 ends the flow of operation.

Now, the seek profiles will be described below.

The seek profile A is a seek profile for seek control to be used when the seek time is short and the residual oscillations are large. The seek profile B is a seek profile for seek control to be used when the seek time is long and the residual oscillations are small. A seek profile may be a VCM current profile, an acceleration profile, a speed profile, a remaining distance profile or some other profile. Now, these seek profiles will be described below by way of specific examples.

Figure 4:
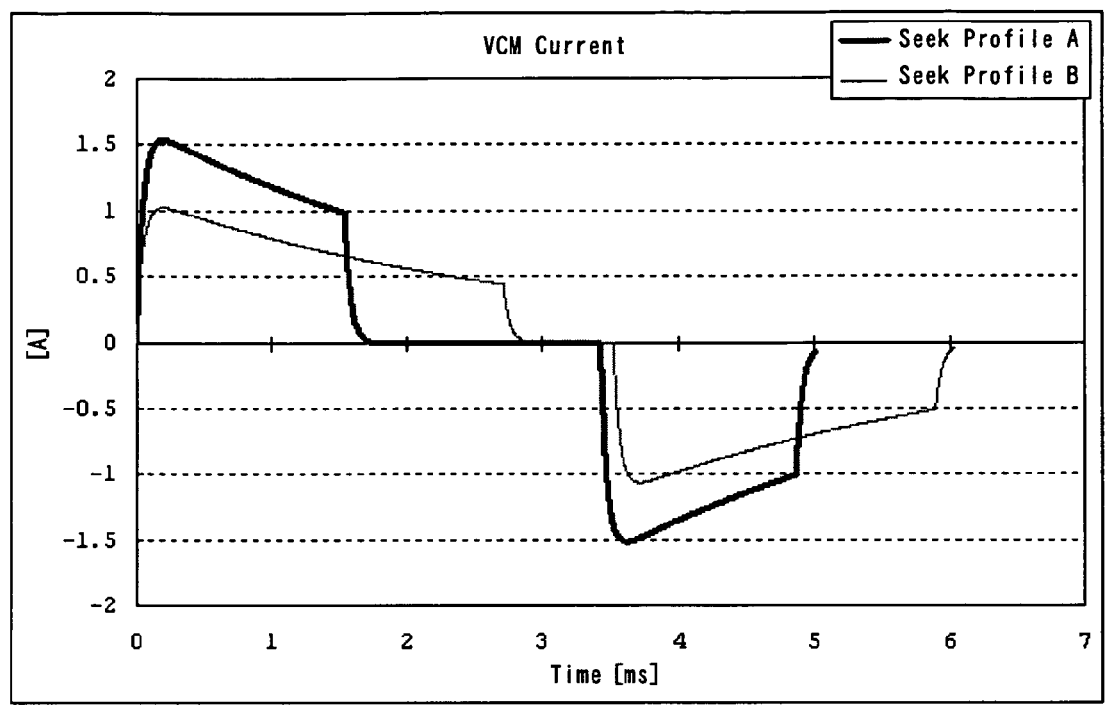
FIG. 4 is a graph illustrating an example of VCM current profile that can be used for the first embodiment.

A VCM current profile predefines the change with time of the VCM current that is the electric current that the VCM control circuit 14 flows to the VCM 21. FIG. 4 is a graph illustrating an example of VCM current profile that can be used for this embodiment. In the graph of FIG. 4, the horizontal axis indicates time and the vertical axis indicates the VCM current. Seek profile A is indicated by a thick solid line and seek profile B is indicated by a thin solid line in FIG. 4.

Figure 5:
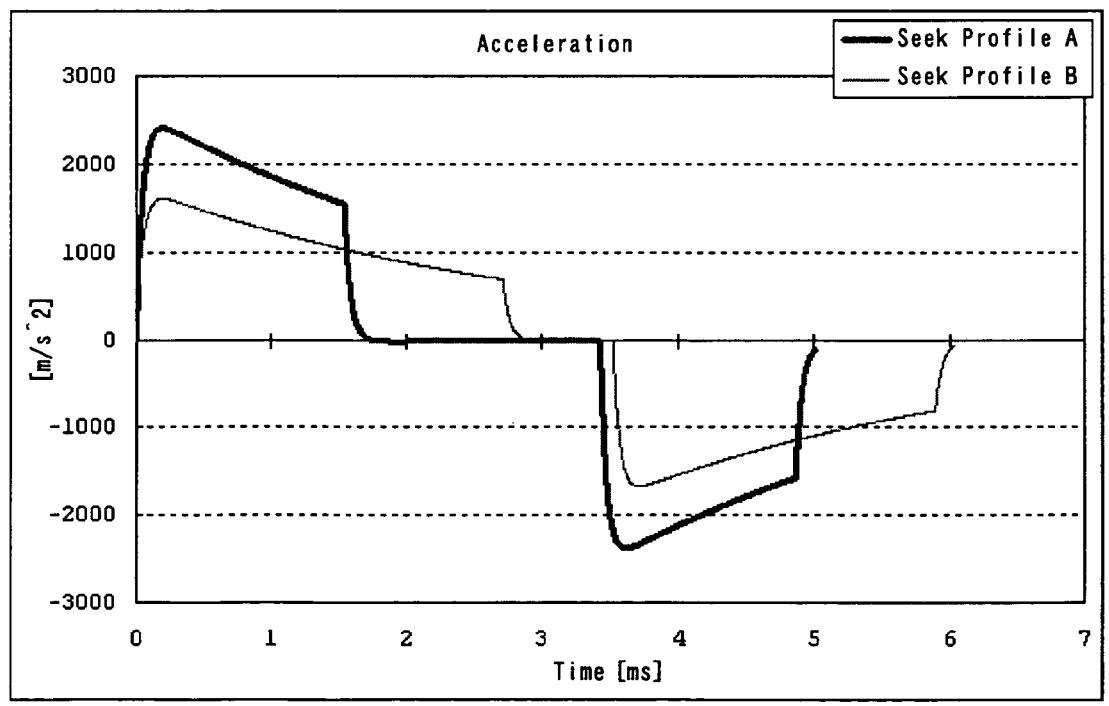
FIG. 5 is a graph illustrating an example of acceleration profile that can be used for the first embodiment.

An acceleration profile predefines the change with time of the acceleration of the head 24. FIG. 5 is a graph illustrating an example of acceleration profile that can be used for this embodiment. In the graph of FIG. 5, the horizontal axis indicates time and the vertical axis indicates the acceleration of the head 24. The waveform of the thick solid line and that of the thin solid line in FIG. 5 respectively indicate seek profile A and seek profile B.

Figure 6:
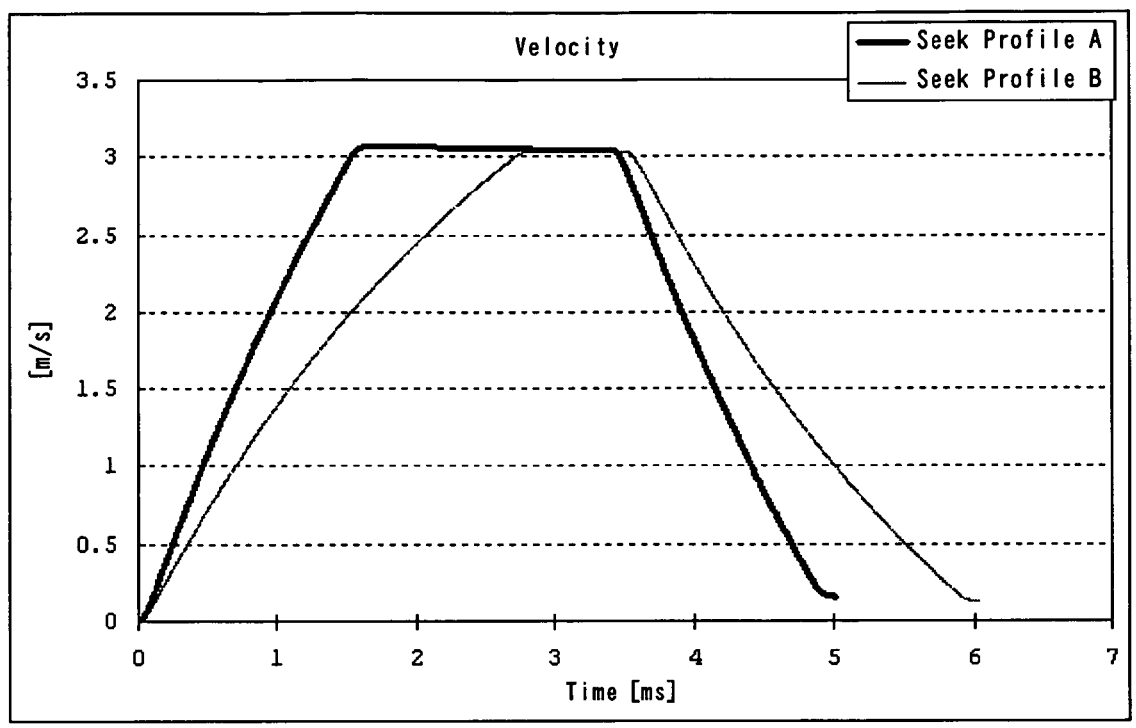
FIG. 6 is a graph illustrating an example of speed profile that can be used for the first embodiment.

A speed profile predefines the change with time of the speed of the head 24. FIG. 6 is a graph illustrating an example of speed profile that can be used for this embodiment. In the graph of FIG. 6, the horizontal axis indicates time and the vertical axis indicates the speed of the head 24. The waveform of the thick solid line and that of the thin solid line in FIG. 6 respectively indicate seek profile A and seek profile B.

Figure 7:
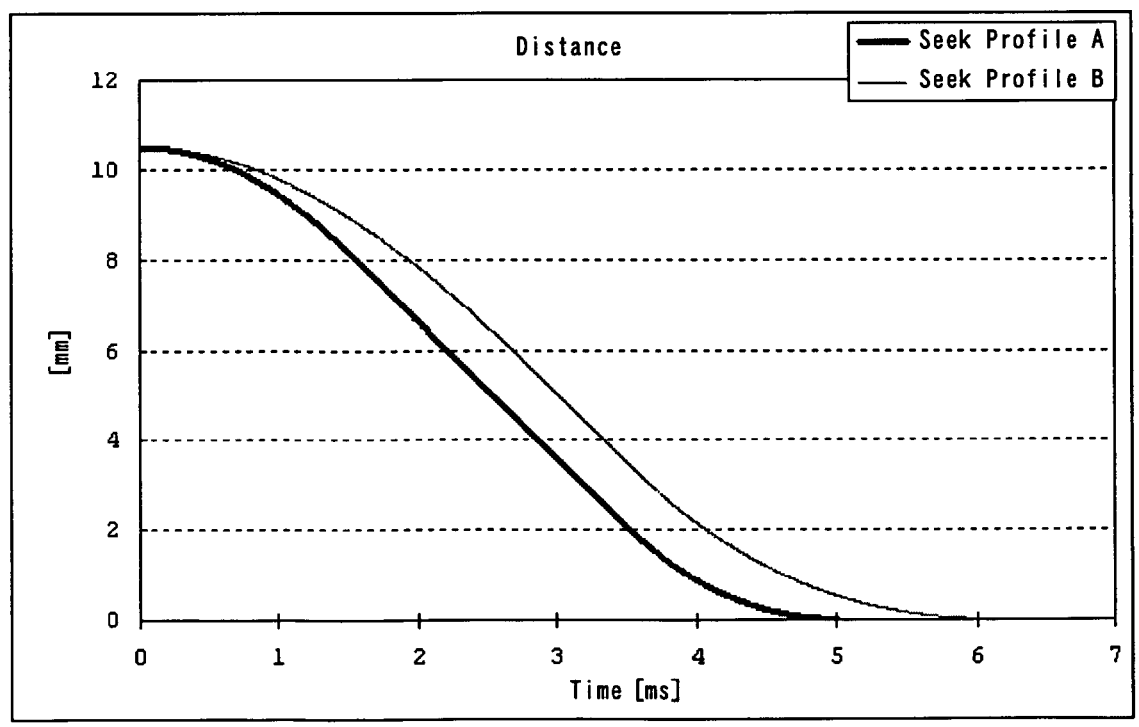
FIG. 7 is a graph illustrating an example of remaining distance profile that can be used for the first embodiment.

A remaining distance profile predefines the change with time of the remaining distance from the head 24 to the target track. FIG. 7 is a graph illustrating an example of remaining distance profile that can be used for this embodiment. In the graph of FIG. 7, the horizontal axis indicates time and the vertical axis indicates the remaining distance of the head 24. The waveform of the thick solid line and that of the thin solid line in FIG. 7 respectively indicate seek profile A and seek profile B.

Now, reordering will be described below. Reordering is a functional feature of the MCU 11 (the firmware of the magnetic disk apparatus) for storing the commands that the MCU 11 receives from a host on a queue and rearranging the commands so that the command that provides the fastest seek operation may be followed with priority. Firstly, the MCU 11 determines the predicted seek time on the basis of the access time curve that the MCU 11 possesses in advance and computes the rotary latency time between the end of the seek and the actual coming of the sector to be used for writing. Then, the MCU 11 sequentially follows the commands one by one, starting from the command that provides the short value for the predicted seek time+predicted rotary latency time to reduce the time necessary for completing all the commands.

Figure 8:
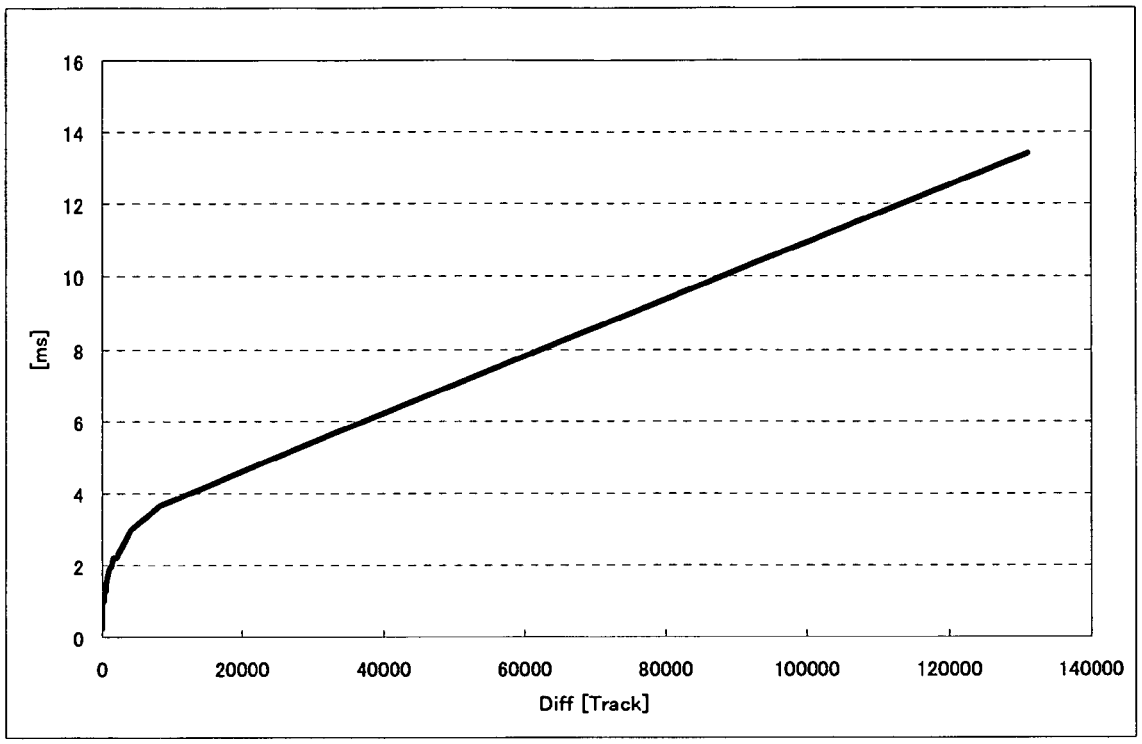
FIG. 8 is a graph illustrating an example of access time curve.

FIG. 8 is a graph illustrating an example of access time curve. In the graph of FIG. 8, the horizontal axis indicates the moving distance of the head in terms of the number of tracks and the vertical axis indicates the predicted seek time. In this embodiment, such an access time curve is provided for each seek profile.

Note that, while seek control based on speed control is described above for this embodiment, seek control may alternatively be entirely based on position control. It may be so arranged that the embodiment has VCM current profiles and position track profiles as a table and employs feed forward seek control for flowing a feed forward current according to the table.

Thus, with this embodiment, it is possible to reduce retries and improve the seek performance of the head and the overall performance of the magnetic disk apparatus by preparing seek profiles for each predetermined range of block length and selecting a seek profile that increases the seek time and reduces the residual oscillations when the block length is large. Additionally, since a seek profile that is slower than ever is used, the embodiment is improved in terms of power consumption, seek noises and the heat emission of the VCM coil.

Second Embodiment

A second embodiment of the present invention is a magnetic disk apparatus in which an offset is added to the access time curve.

The magnetic disk apparatus of this embodiment has a configuration similar to that of the first embodiment.

While the operation of the magnetic disk apparatus of this embodiment is similar to that of the first embodiment in terms of the flow of operation, it employs seek profiles of only one type so that the processing steps S11, S12 and S13 of the first embodiment are not required for this embodiment.

Figure 9:
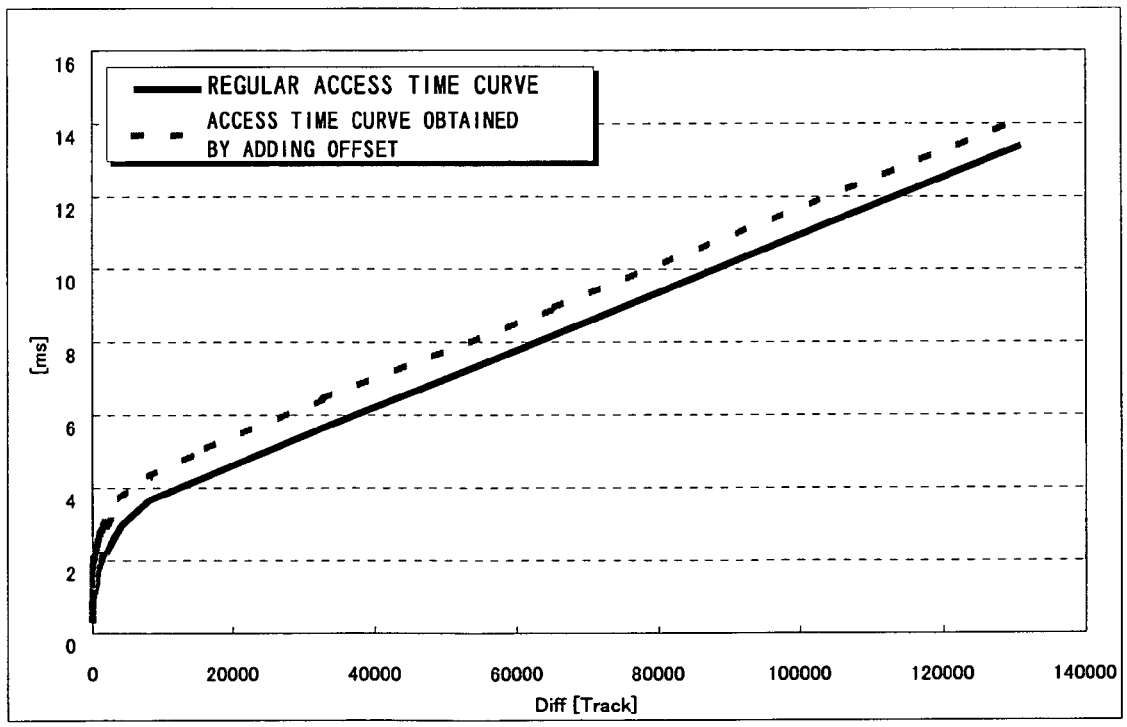
FIG. 9 is a graph illustrating an example of access time curve that can be used for a second embodiment.

As for the reordering of the processing step S21, the MCU 11 of this embodiment employs an access time curve obtained by adding an offset to the predetermined seek time of the ordinary access time curve of the first embodiment. FIG. 9 is a graph illustrating an example of access time curve that can be used for the second embodiment. The quantity of offset is defined to be small when the block length is small and large when the block length is large.

Now, a technique of determining the quantity of offset in advance will be described below. Firstly, the block length is fixed for observing the performance of the head, changing the quantity of offset, and the quantity of offset that maximizes the performance is determined. In this way, the quantity of offset is determined for block length. The obtained relationship between the block length and the quantity of offset is stored in a table or an access time curve and utilized by the MCU 11 for reordering.

Another technique of determining the quantity of offset in advance will be described below. As pointed out above, it is possible to determine the probability of getting to a retry process in a write operation with a given block length and a given seek time, the probability is multiplied by the time required for a retry process (the time of making a full turn) to determine the expected retry time, which is then used as quantity of offset.

Thus, with this embodiment, a seek process involving large residual oscillations will hardly be selected for reordering as a result of adding a predetermined offset to the access time curve when the block length is large so that it is possible to reduce the use of a write process that involves large residual oscillations.

While the present invention is described above from the viewpoint of reducing write off tracks, the present invention provides advantages for read processes similar to those described above for write processes.

For the purpose of the present invention, seek profiles, access time curves and offsets described above for embodiments correspond to control information. The processing steps S11, S12 and S13 of the above-described embodiments correspond to the control information acquisition step. The processing steps S21 through S32 of the above-described embodiments correspond to the control step. While control information is stored in the storage section 18 in the above-description of the embodiments, it may alternatively be stored in a control information region of a disk medium.

For the purpose of the present invention, a seek control apparatus can be applied to a storage apparatus without difficulties to improve the performance of the storage apparatus. The storage apparatus may be a magnetic disk apparatus, an optical disk apparatus, a magneto-optical disk apparatus or some other storage apparatus.

What is claimed is:

1. A seek control apparatus for performing a seek control of a head, comprising:
    a control section that acquires control information corresponding to an externally indicated data length out of the control information stored in a control information storage section storing the control information for seek control for each of a plurality of data length ranges and performs a seek control according to the acquired control information;
    wherein the control information includes information on the relationship between a seek distance and a seek time and a predetermined offset to be added to the seek time for each of the data length ranges; and
    the control section performs a reordering operation according to the control information.

2. The apparatus according to claim 1, wherein the control information includes information on a seek profile for each of the data length ranges.

3. The apparatus according to claim 2, wherein the control information includes information on the relationship between a seek distance and a seek time corresponding to each of the seek profiles.

4. The apparatus according to claim 1, wherein the offset is determined according to a retry probability in each of the data length ranges.

5. The apparatus according to claim 1, wherein the data length is an externally indicated data length of a write operation or a read operation.

6. The apparatus according to claim 1, wherein the data length is a block length.

7. A seek control method for performing a seek control of a head, comprising:
- a control information acquisition step that acquires control information corresponding to an externally indicated data length out of the control information stored in advance for seek control for each of a plurality of data length ranges; and
- a control step that performs a seek control according to the control information acquired in the control information acquisition step;
- wherein the control information includes information on the relationship between a seek distance and a seek time and a predetermined offset to be added to the seek time for each of the data length ranges; and
- the control step performs a reordering operation according to the control information.

8. The method according to claim 7, wherein
the control information includes information on a seek profile for each of the data length ranges.

9. The method according to claim 8, wherein
the control information includes information on the relationship between a seek distance and a seek time corresponding to each of the seek profiles.

10. The method according to claim 7, wherein
the offset is determined according to a retry probability in each of the data length ranges.

11. The method according to claim 7, wherein
the data length is an externally indicated data length of a write operation or a read operation.

12. The method according to claim 7, wherein
the data length is a block length.

13. A storage apparatus to be used for seek control of a head, the storage apparatus comprising:
- a control information storage section that stores control information for seek control for each of a plurality of predetermined data length ranges; and
- a control section that acquires the control information corresponding to an externally indicated data length out of the control information stored in the control information storage section and performs a seek control according to the control information;
- wherein the control information includes information on the relationship between a seek distance and a seek time and a predetermined offset to be added to the seek time for each of the data length ranges; and
- the control section performs a reordering operation according to the control information.

14. The apparatus according to claim 13, wherein
the control information includes information on a seek profile for each of the data length ranges.

15. The apparatus according to claim 14, wherein
the control information includes information on the relationship between a seek distance and a seek time corresponding to each of the seek profiles.

16. The apparatus according to claim 13, wherein
the offset is determined according to the retry probability in each of the data length ranges.

17. The apparatus according to claim 13, wherein
the data length is the externally indicated data length of a write operation or a read operation.

* * * * *